US007989096B2

(12) United States Patent
Berger et al.

(10) Patent No.: US 7,989,096 B2
(45) Date of Patent: *Aug. 2, 2011

(54) PERPENDICULAR RECORDING MEDIA HAVING AN EXCHANGE-SPRING STRUCTURE

(75) Inventors: Andreas Berger, San Jose, CA (US); Eric Edward Fullerton, Morgan Hill, CA (US); Hoa Van Do, Freemont, CA (US); Natacha Supper, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/691,603

(22) Filed: Jan. 21, 2010

(65) Prior Publication Data

US 2010/0128391 A1    May 27, 2010

Related U.S. Application Data

(63) Continuation of application No. 11/231,516, filed on Sep. 21, 2005, now Pat. No. 7,687,157, which is a continuation-in-part of application No. 11/051,536, filed on Feb. 4, 2005, now Pat. No. 7,425,377.

(51) Int. Cl.
*G11B 5/66* (2006.01)

(52) U.S. Cl. ........................................ 428/828; 428/829

(58) Field of Classification Search ........................ None
See application file for complete search history.

(56) References Cited

U.S. PATENT DOCUMENTS

| | | | |
|---|---|---|---|
| 4,731,300 A | 3/1988 | Watanabe et al. |
| 4,745,510 A | 5/1988 | Watanabe et al. |
| 5,851,643 A | 12/1998 | Honda et al. |
| 6,043,947 A | 3/2000 | Gooch et al. |
| 6,183,893 B1 | 2/2001 | Futamoto et al. |
| 6,468,670 B1 | 10/2002 | Ikeda et al. |
| 6,773,826 B2 | 8/2004 | Nakagawa et al. |
| 6,773,834 B2 | 8/2004 | Do et al. |
| 6,811,890 B1 | 11/2004 | Zhou et al. |
| 6,830,824 B2 | 12/2004 | Kikitsu et al. |
| 6,834,026 B2 | 12/2004 | Fullerton et al. |
| 6,852,426 B1 | 2/2005 | Girt et al. |

(Continued)

FOREIGN PATENT DOCUMENTS

WO    93/12928    7/1993

(Continued)

OTHER PUBLICATIONS

Fullerton et al., "Hard/soft magnetic heterostructures: model exchange-spring magnets," Journal of Magnetism and Magnetic Materials 200 (1999) 392-404.

(Continued)

*Primary Examiner* — Kevin M Bernatz
(74) *Attorney, Agent, or Firm* — Kunzler Needham Massey & Thorpe (57) ABSTRACT

A recording medium providing improved writeability in perpendicular recording applications includes a magnetic recording layer having an axis of magnetic anisotropy substantially perpendicular to the surface thereof, an exchange-spring layer ferromagnetically exchange coupled to the magnetic recording layer and having a coercivity less than the magnetic recording layer coercivity, and a coupling layer between the magnetic recording layer and the exchange-spring layer. The coupling layer regulates the ferromagnetic exchange coupling between the magnetic recording layer and the exchange-spring layer.

28 Claims, 6 Drawing Sheets

U.S. PATENT DOCUMENTS

| | | | |
|---|---|---|---|
| 6,881,495 B2 | 4/2005 | Kikitsu et al. | |
| 6,881,497 B2 | 4/2005 | Coffey et al. | |
| 6,939,626 B2 | 9/2005 | Tang | |
| 7,081,309 B2 | 7/2006 | Do et al. | |
| 7,149,045 B1 | 12/2006 | Mallary et al. | |
| 7,166,376 B2 | 1/2007 | Hikosaka et al. | |
| 7,314,675 B1 | 1/2008 | Nolan | |
| 7,425,377 B2 | 9/2008 | Fullerton et al. | |
| 7,498,092 B2 * | 3/2009 | Berger et al. | 428/829 |
| 7,582,368 B2 * | 9/2009 | Berger et al. | 428/827 |
| 7,588,841 B2 * | 9/2009 | Berger et al. | 428/827 |
| 7,687,157 B2 * | 3/2010 | Berger et al. | 428/828 |
| 7,846,563 B2 * | 12/2010 | Berger et al. | 428/827 |
| 2001/0009727 A1 | 7/2001 | Akimoto et al. | |
| 2002/0160230 A1 | 10/2002 | Yoshikawa et al. | |
| 2003/0108721 A1 | 6/2003 | Fullerton et al. | |
| 2003/0152805 A1 | 8/2003 | Bertero et al. | |
| 2003/0170500 A1 | 9/2003 | Shimizu et al. | |
| 2005/0053803 A1 | 3/2005 | Umeda et al. | |
| 2006/0146451 A1 | 7/2006 | Inomata et al. | |
| 2006/0166039 A1 | 7/2006 | Berger et al. | |
| 2006/0177703 A1 | 8/2006 | Takenoiri et al. | |
| 2006/0188753 A1 | 8/2006 | Lee et al. | |
| 2006/0204791 A1 | 9/2006 | Sakawaki et al. | |
| 2006/0222900 A1 | 10/2006 | Inamura et al. | |
| 2006/0274452 A1 | 12/2006 | Arya | |
| 2007/0072011 A1 | 3/2007 | Li et al. | |

FOREIGN PATENT DOCUMENTS

WO      2004/090874 A1      10/2004

OTHER PUBLICATIONS

Suess et al., "Optimization of Exchange Spring Perpendicular Recording Media," GB-07, available prior to Sep. 21, 2005, publication date unknown.

Bai et al., "Composite Perpendicular Magnetic Recording Media Using [Co/PdSi]n as Hard Layer and FeSiO as Soft Layer," Weikang Shen, University of Minnesota, Department of Electrical & Computer Engineeringavailable prior to Sep. 21, 2005, publication date unknown.

Thiele et al., "FeRh/FePt exchange spring films for thermally assisted magnetic recording media," Applied Physics Letters 82 (17): 2859-2861, 2003.

Thiele et al., "Magnetic and Structural Properties of FePt-FeRh Exchange Spring Films for Thermally Assisted Magnetic Recording Media," IEEE Transactions on Magnetics 40 (4): 2537-2542 Part 2, Jul. 2004.

Jiang et al, "[CoAl/Pd]n multilayers as perpendicular recording media," Journal of Applied Physics, May 15, 2002, vol. 91, Issue 10, pp. 8067-8069.

\* cited by examiner

Magnetic Recording Layer 302 (CoPtCrTaOx) +
Coupling Layer 306 (CoRu) +
Exchange Spring Layer 304 (CoPtCrSiOx - 3 nm)

Fig. 7A

Magnetic Recording Layer 302 (CoPtCrTaOx) +
Coupling Layer 306 (CoRu) +
Exchange Spring Layer 304 (CoPtCrSiOx - 3nm)

Fig. 7B

Magnetic Recording Layer 302 (CoPtCrTaOx) +
Coupling Layer 306 (CoRu - 6 A) +
Exchange Spring Layer 304 (CoPtCrSiOx - 3nm)

Fig. 8

PERPENDICULAR RECORDING MEDIA HAVING AN EXCHANGE-SPRING STRUCTURE

RELATED APPLICATIONS

This application is a continuation application of and claims priority to, application Ser. No. 11/231,516, filed on Sep. 21, 2005, issued as U.S. Pat. No. 7,687,157 and entitled "PERPENDICULAR RECORDING MEDIA HAVING AN EXCHANGE-SPRING STRUCTURE" which is a continuation-in-part of application Ser. No. 11/051,536, filed on Feb. 4, 2005 and issued as U.S. Pat. No. 7,425,377 which is incorporated herein in its entirety.

BACKGROUND OF THE INVENTION

1. Field of the Invention

This invention relates to perpendicular magnetic recording media and more particularly to apparatus and methods for improving the writeability of perpendicular magnetic recording media.

2. Description of the Related Art

One of the primary challenges to increasing areal densities of magnetic recording media is overcoming the constraints imposed by the superparamagnetic effect. The superparamagnetic effect becomes significant when microscopic magnetic grains on the recording media become so small that they lose their ability to maintain their magnetic orientations. This condition may result in "flipped bits," a condition where the magnetization of the bits suddenly and spontaneously reverses from north to south. Such a condition corrupts the data stored on the media, rendering the data as well as the storage device it is stored on unreliable and unusable.

In conventional longitudinal recording media, data bits are aligned horizontally, parallel to the surface of the disk. In perpendicular recording media, the data bits are aligned vertically, perpendicular to the disk. For example, referring to FIG. 1, a typical perpendicular recording device 100 may include a recording head 102 and a magnetic recording medium 104. The recording head 102 may include a write element 106, for writing magnetic signals to the recording medium 104, and a read element 108, to detect magnetic signals stored on the recording medium 104.

Figure 1:
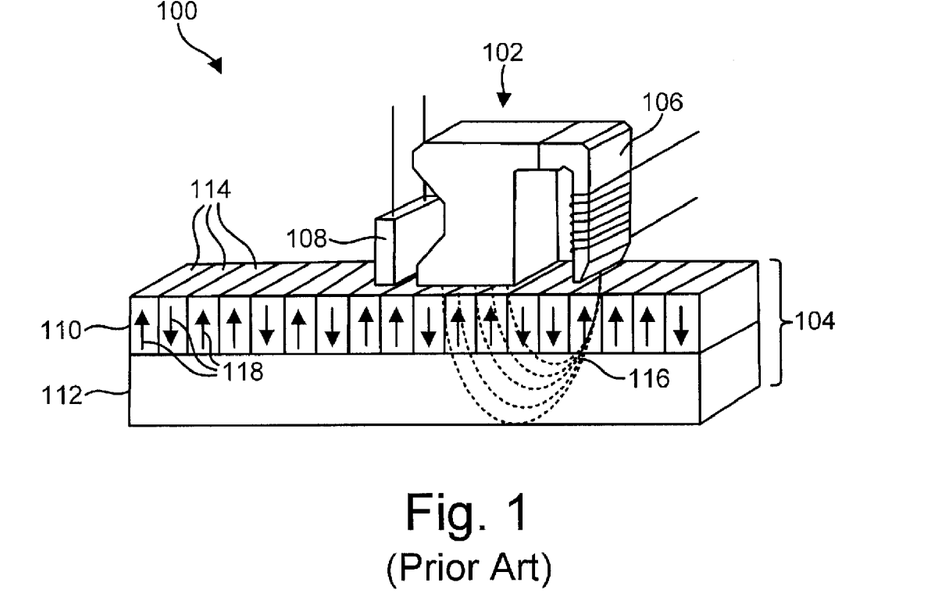
FIG. 1 is a schematic diagram illustrating one embodiment of a conventional perpendicular recording device.

The magnetic recording medium 104 may include a magnetic recording layer 110, to store data, and a soft underlayer 112 to provide a return path for magnetic write fields generated by the write element 106. The magnetic recording layer 110 may comprise various magnetic grains each having a magnetic easy axis substantially perpendicular to the media surface, thereby allowing the grains to be vertically magnetized. When writing, the write element 106 generates a magnetic write field 116 that travels vertically through the magnetic recording layer 110 and returns to the write element 106 through the soft underlayer 112. In this manner, the write element 106 magnetizes vertical regions 114, or bits 114, in the magnetic recording layer 110. Because of the easy axis orientation, each of these bits 114 has a magnetization 118 that points in a direction substantially perpendicular to the media surface.

Because of the ability to utilize a soft underlayer in the perpendicular geometry, write fields generated by the perpendicular write element 106 may be substantially larger than conventional longitudinal recording write fields. This allows use of media 104 having a higher coercivity (Hc) and anisotropy energy (Ku), which is more thermally stable. Furthermore, unlike longitudinal recording, where the magnetic fields between two adjacent bits have a destabilizing effect, the magnetic fields of magnetization 118 of bits in perpendicular recording media 104 stabilize each other, enhancing the overall stability of perpendicular magnetic recording media even further. This allows for closer bit packing.

Figure 2:
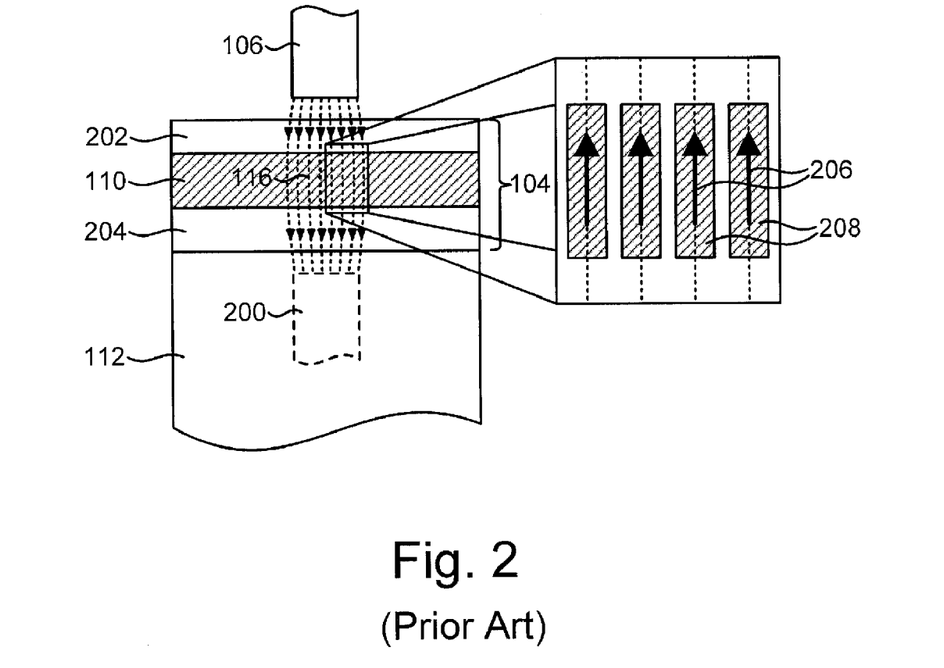
FIG. 2 is a cross-sectional view of one embodiment of conventional perpendicular recording media.

Referring to FIG. 2, as mentioned, one benefit of perpendicular recording is that the magnetic recording medium 104 is placed within the gap between the write element 106 and the soft underlayer 112, thereby allowing significantly higher write fields. When the write element 106 is writing the magnetic recording layer 110, the soft underlayer 112 reacts to the applied field of write element 106 in such a way that a mirror image 200 of the write element 106, or a secondary write pole 200, is generated in the soft underlayer 112. The write element 106 and the secondary write pole 200 together produce an apparent recording head 106, 200. In certain embodiments, the magnetic recording medium 104 may include an non-magnetic overcoat 202, above the magnetic recording layer 110, and an exchange break layer 204 to magnetically decouple the magnetic recording layer 110 from the soft underlayer 112.

One of the problem for conventional perpendicular media is that the magnetization 206, or magnetic easy axis 206, of the magnetic recording layer 110 is oriented nearly parallel to the magnetic field 116. This geometry has the disadvantage that relatively high reversal fields are necessary to reverse the magnetization 206 of the grains 208 of the magnetic recording layer 100 because little or no torque is exerted onto the grain magnetization 206 by the magnetic write field 116. Furthermore, such a nearly parallel alignment of field 116 and magnetization 206 has the additional disadvantage that the magnetization reversal time of the media grains 208 is increased. For these reasons, there have been proposals to produce magnetic media comprising magnetic grains having a magnetic easy axis that is tilted, or non-parallel, with respect to the surface normal. However, at the present time, apparatus and methods for producing high-quality recording media with a uniformly tilted easy axis do not exist.

Accordingly, what are needed are apparatus and methods for improving the writeability of perpendicular magnetic recording media. Further needed are apparatus and methods for producing perpendicular magnetic recording media that behaves like media with a tilted easy axis, while still being fully compatible with currently used processes and structures for producing perpendicular recording media. Such apparatus and methods are disclosed herein.

SUMMARY OF THE INVENTION

The present invention has been developed in response to the present state of the art, and in particular, in response to the problems and needs in the art that have not yet been fully solved by currently available apparatus and methods. Accordingly, the present invention has been developed to provide apparatus and methods for improving the writeability of perpendicular magnetic recording media that overcome many or all of the above-discussed shortcomings in the art.

In one embodiment in accordance with the invention, a recording medium providing improved writeability in perpendicular recording applications includes a magnetic recording layer having an axis of magnetic anisotropy substantially perpendicular to the surface thereof, an exchange-spring layer ferromagnetically exchange coupled to the magnetic recording layer and having a coercivity less than the magnetic recording layer coercivity, and a coupling layer between the magnetic recording layer and the exchange-spring layer. The coupling layer regulates the ferromagnetic exchange coupling between the magnetic recording layer and the exchange-spring layer. Preferably, the coupling layer has a thickness less than the exchange-spring layer thickness. The magnetic recording layer and the exchange-spring layer comprise a granular cobalt alloy suitable to achieve an appropriate and sufficiently low level of inter-granular exchange coupling within each respective layer.

In certain embodiments, the exchange-spring layer, the magnetic recording layer, or both, may comprise a material such as CoPt, CoPtCr, and may optionally include an oxide such as a Si, Ti, and Ta oxide. In selected embodiments, the coercivities of the magnetic recording layer and the exchange-spring layer are adjusted by among other process parameters modifying the amount of platinum therein. The coupling layer may comprise a material such as CoRu, CoCr, CoRuCr, and may optionally comprise an oxide such as a Si, Ti, and Ta oxide.

In certain embodiments, the coupling layer has a thickness of less than two nanometers. More particularly, the coupling layer may have a thickness of between 0.2 nanometers and 1 nanometer. Likewise, in certain embodiments, the exchange-spring layer has a thickness of less than ten nanometers and, more particularly, may have a thickness of between two nanometers and six nanometers. In selected embodiments, the exchange-spring layer is thicker than the coupling layer. Furthermore, in certain embodiments, the inter-granular exchange coupling of the exchange-spring layer is greater than the inter-granular exchange coupling of the magnetic recording layer.

In another embodiment in accordance with the invention, a recording device providing improved writeability in perpendicular recording applications includes a recording head and a recording medium configured for perpendicular recording. The recording medium comprises a magnetic recording layer having an axis of magnetic anisotropy substantially perpendicular to the surface thereof, an exchange-spring layer between the magnetic recording layer and the recording head, the exchange-spring layer ferromagnetically exchange coupled to the magnetic recording layer and having a coercivity less than the magnetic recording layer coercivity, and a coupling layer between the magnetic recording layer and the exchange-spring layer. The coupling layer regulates the ferromagnetic exchange coupling between the magnetic recording layer and the exchange-spring layer. The magnetic recording layer and the exchange-spring layer preferably comprise a granular cobalt alloy.

In another embodiment in accordance with the invention, a method for improving the writeability of perpendicular recording media includes forming a magnetic recording layer having an axis of anisotropy substantially perpendicular to the surface thereof, forming an exchange-spring layer comprising substantially magnetically separated grains, the exchange-spring layer ferromagnetically exchange coupled to the magnetic recording layer and having a coercivity less than the magnetic recording layer coercivity, and disposing a coupling layer between the magnetic recording layer and the exchange-spring layer, the coupling layer regulating the ferromagnetic exchange coupling between the magnetic recording layer and the exchange-spring layer. The exchange-spring layer preferably comprises a granular cobalt alloy.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are disclosed to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

For the purposes of this description, the phrase "axis of magnetic anisotropy" is used to mean the magnetic easy axis of a magnetic material.

Figure 3:
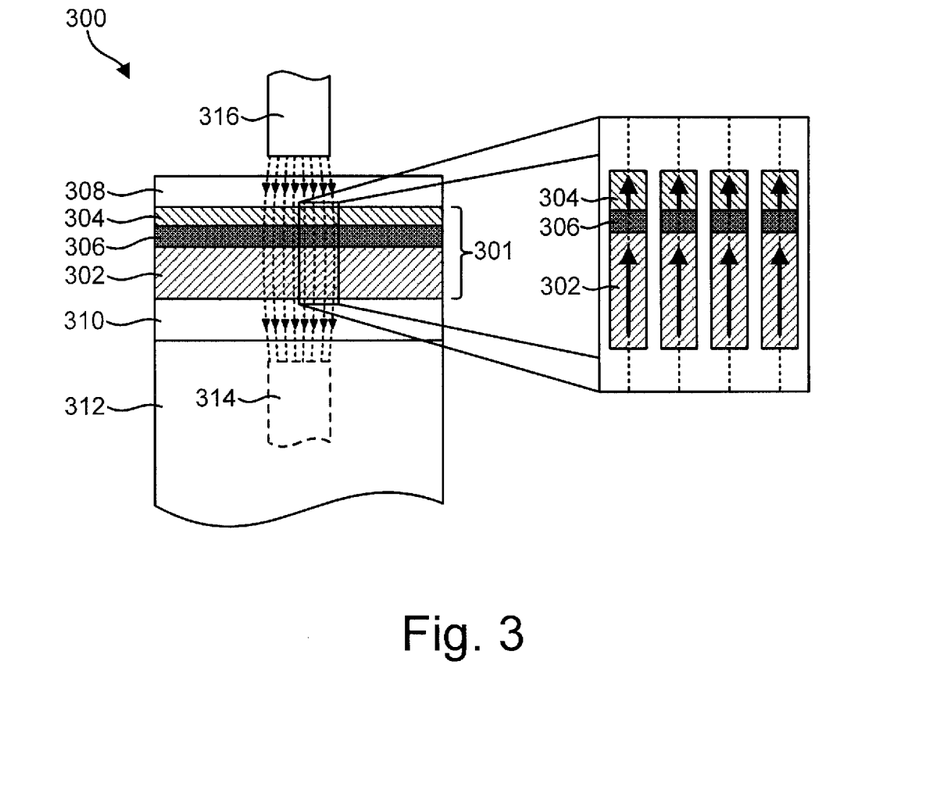
FIG. 3 is a cross-sectional view of one embodiment of perpendicular recording media using an exchange-spring structure in accordance with the invention.

Referring to FIG. 3, a perpendicular magnetic recording medium 300 incorporating an exchange-spring structure 301 in accordance with the invention may comprise a magnetic recording layer 302 ferromagnetically coupled to an exchange-spring layer 304. The magnetic recording layer 302 and the exchange-spring layer 304 are preferably layers of a granular cobalt alloy with a hexagonal close packed (hcp) crystalline structure that exhibit perpendicular magnetic anisotropy, such as a CoPt or CoPtCr alloys, with or without an oxide, such as oxides of Si, Ti and Ta. However, while the magnetic recording layer 302 may be relatively hard magnetically (e.g., Hk>10 kOe), the exchange spring layer 304 may be considerably softer (e.g., Hk<6 kOe). In certain embodiments, the magnetic recording layer 302 and the exchange-spring layer 304 are of a same or similar material and the coercivity of each is adjusted along with other processing parameters by modifying the amount of platinum contained therein. A higher proportion, or concentration, of platinum per volume of the magnetic recording layer 302 relative to the exchange spring layer 304 will increase the magnetic hardness of the recording layer 302 relative to the exchange spring layer 304.

The materials specified above may be suitable to achieve an appropriate (i.e., low) level of inter-granular exchange coupling in the magnetic recording layer 302 and the exchange spring layer 304, respectively. Although, the inter-granular exchange coupling of the exchange spring layer 304 may exceed that of the magnetic recording layer 302, it is preferable that the inter-granular exchange coupling of the exchange spring layer 304 be sufficiently low to minimize or reduce negative effects, such as lower signal-to-noise ratio or the like, that a higher inter-granular exchange coupling might have on the magnetic recording layer 302. In certain embodiments, the exchange-spring layer has a thickness of less than ten nanometers, and more preferably between about two nanometers and six nanometers.

A coupling layer 306 is disposed between the magnetic recording layer 302 and the exchange-spring layer 304 to regulate or mediate the exchange coupling between the two layers 302, 304. This aids the magnetization reversal process of the magnetic recording layer 302 by exerting an additional bias field and torque on the grains of the magnetic recording layer 302 upon applying a reverse magnetic field. The coupling layer 306 is preferably a weakly magnetic or non-magnetic granular alloy layer with an hcp crystalline structure, such as a CoRu, CoCr or CoRuCr alloy, with or without an oxide, such as oxides of Si, Ti, and Ta, which is suitable to mediate a ferromagnetic coupling of appropriate strength between the magnetic recording layer 302 and the exchange-spring layer 304. Depending on the choice of material, and more particularly on the concentration of cobalt in the coupling layer 306, the coupling layer 306 may have a thickness of less than two nanometers, and more preferably between about 0.2 nanometers and 1 nanometer. Although in certain embodiments, the thickness of the coupling layer 306 may exceed 1 nanometer. Because cobalt is highly magnetic, a higher concentration of cobalt in the coupling layer 306 may be offset by thickening the coupling layer 306 in order to achieve an optimal inter-layer exchange coupling between the magnetic recording layer 302 and the exchange-spring layer 304.

As will be discussed in more detail hereinafter, the inter-layer exchange coupling between the magnetic recording layer 302 and the exchange-spring layer 304 may be optimized, in part, by adjusting the materials and thickness of the coupling layer 306. Preferably, the inter-layer exchange coupling is not so weak that the exchange-spring layer 304 and the magnetic recording layer 302 behave as independent entities. Likewise, the inter-layer exchange coupling is preferably not so strong that the magnetic behavior of the exchange-spring layer 304 and the magnetic recording layer 302 are rigidly bound together. The inter-layer exchange coupling should be adjusted such that the magnetization of the exchange-spring layer 304 reverses before that of the magnetic recording layer 302, while exerting enough torque onto the grains of the magnetic recording layer 302 to aid in the magnetic reversal of the magnetic recording layer 302.

Furthermore, as mentioned, in preferred embodiments, the exchange-spring layer 304 is magnetically softer (lower coercivity) than the magnetic recording layer 302. Also, the exchange-spring layer 304 may be characterized by an inter-granular exchange coupling that is greater than the inter-granular exchange coupling of the magnetic recording layer 302. By adjusting the thickness and materials of the coupling layer 306 to optimize the inter-layer exchange coupling between the exchange-spring layer 304 and the magnetic recording layer 302, negative effects caused by the exchange-spring layer's 304 higher inter-granular exchange coupling, such as lower signal-to-noise ratios or the like, may be at least partially isolated from the magnetic recording layer 302.

In certain embodiments, an overcoat 308 may be physically and preferably not magnetically coupled to the exchange-spring layer 304. Similarly, the magnetic recording layer 302 may be physically coupled to a soft underlayer 312 by way of an exchange-break layer 310. The soft underlayer 312 may be a multi-layer structure that provides a mirror image 314 (i.e., a secondary write pole 314) of a real write head 316, thereby allowing large write fields to pass through the media 300. The exchange-break layer 310 may be used to magnetically decouple the magnetic recording layer 302 from the soft underlayer 312.

Figure 4:
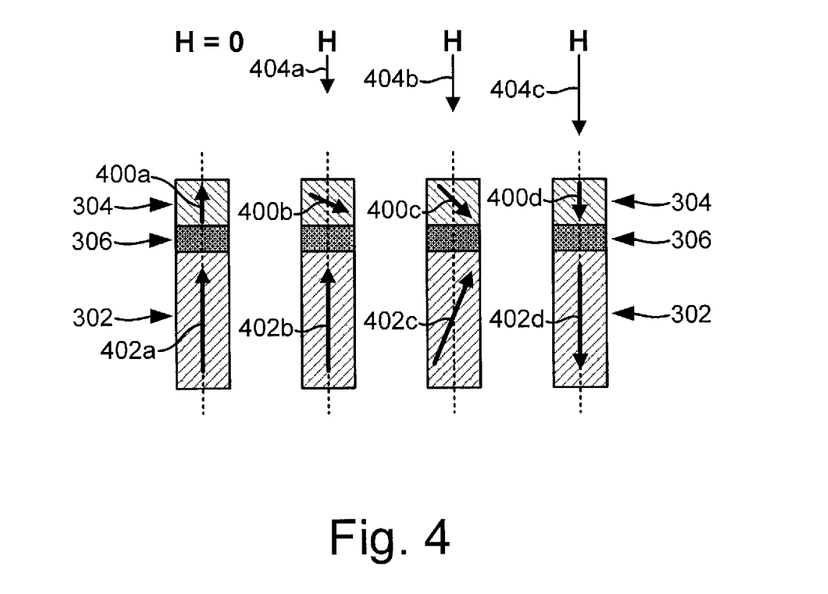
FIG. 4 is a schematic diagram illustrating the magnetization reversal of perpendicular recording media using an exchange-spring structure in accordance with the invention.

Referring to FIG. 4, absent a magnetic field and prior to reversal, the magnetization 400a, 402a of both the exchange-spring layer 304 and the magnetic recording layer 302 may point in either a north or south direction. Upon applying a reverse magnetic field 404a, the magnetization 400b of the softer exchange-spring layer 304 may begin to reverse, thereby exerting a torque onto the magnetically harder magnetic recording layer 302. As the magnetic field 404b increases, the magnetization 402c of the magnetic recording layer 302 begins to reverse and follow the magnetization 400c of the exchange-spring layer 304. Finally, as the magnetic field 404c increases further, the magnetization 400d, 402d of both the exchange-spring layer 304 and the magnetic recording layer 302 reverses entirely. Advantageously, the exchange-spring media 300 exhibits a magnetization reversal behavior which is similar to a magnetic recording layer having a tilted magnetic easy axis, while still being fully compatible with conventional perpendicular media deposition and fabrication processes and structures.

Figure 5A:
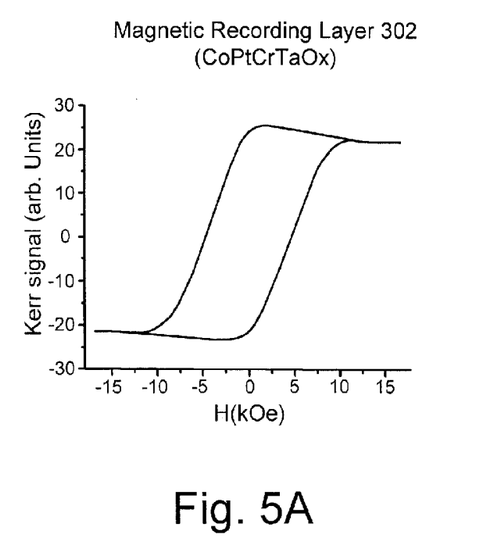
FIG. 5A is a graph illustrating one embodiment of a magnetic hysteresis loop for the magnetic recording layer by itself.
Figure 5B:
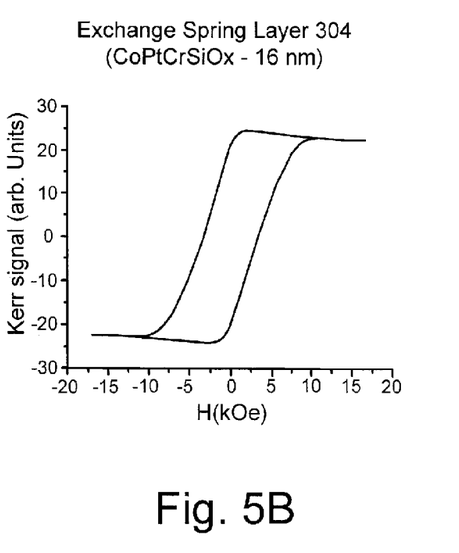
FIG. 5B is a graph illustrating one embodiment of a magnetic hysteresis loop for the exchange-spring layer by itself.
Figure 5C:
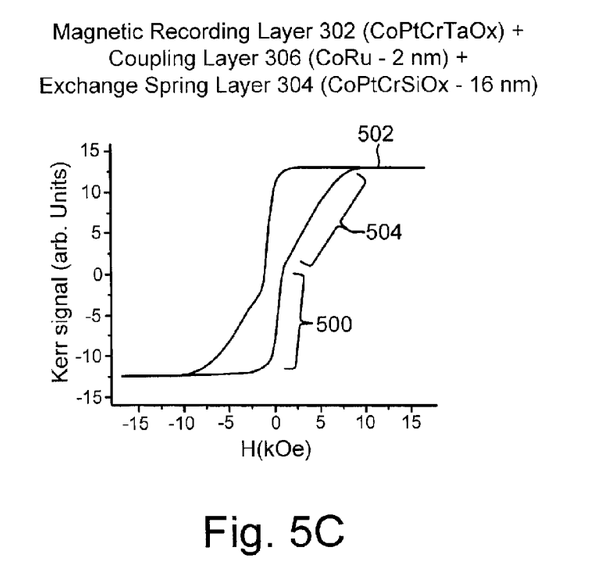
FIG. 5C is a graph illustrating one embodiment of a magnetic hysteresis loop for an exchange-spring structure in accordance with the invention.

Referring to FIGS. 5A through 5C, several hysteresis loops generated with a Kerr magnetometer are illustrated for the magnetic recording layer 302 by itself (FIG. 5A), the exchange-spring layer 304 by itself (FIG. 5B), and an exchange spring structure 301 comprising both the magnetic recording layer 302 and the exchange-spring layer 304 coupled together with a coupling layer 306 (FIG. 5C) in accordance with the present invention. In this example, the magnetic recording layer 302 is cobalt platinum chromium tantalum oxide (CoPtCrTaOx), the exchange-spring layer 304 is cobalt platinum chromium silicon oxide (CoPtCrSiOx), and the coupling layer 306 is cobalt ruthenium (CoRu).

As illustrated by FIGS. 5A and 5B, the narrower hysteresis loop of FIG. 5B compared to that of FIG. 5A shows that the coercivity of the CoPtCrSiOx exchange-spring layer 304 by itself is less than that of the CoPtCrTaOx magnetic recording layer 302 by itself. This is true even for a CoPtCrSiOx exchange-spring layer 304 that is sixteen nanometers thick. When the CoPtCrSiOx exchange-spring layer 304 is thinned (as in the exchange-spring structure 301 of FIG. 3), the coercivity of the exchange-spring layer 304 is significantly less as shown by the steeper slope 500 of the hysteresis loop of FIG. 5C. The subsequent magnetization of the magnetically harder magnetic recording layer 302 is shown by the slower approach to saturation 502, as shown by the reduced slope 504 of the hysteresis loop.

As illustrated by FIG. 5C, when the CoPtCrTaOx magnetic recording layer 302 and CoPtCrSiOx exchange-spring layer 304 are combined into an exchange-spring structure 301 like that illustrated in FIG. 3 with a CoRu layer as the coupling layer 306 the hysteresis loop of FIG. 5C closes for a magnetic field (H) of approximately 9 kOe, whereas the hysteresis loop of FIG. 5A closes for a magnetic field (H) of approximately 12 kOe, showing that all or most of the grains of the exchange-spring structure 301 of FIG. 5C may be switched with a magnetic field reduced by approximately twenty-five percent.

Figure 6A:
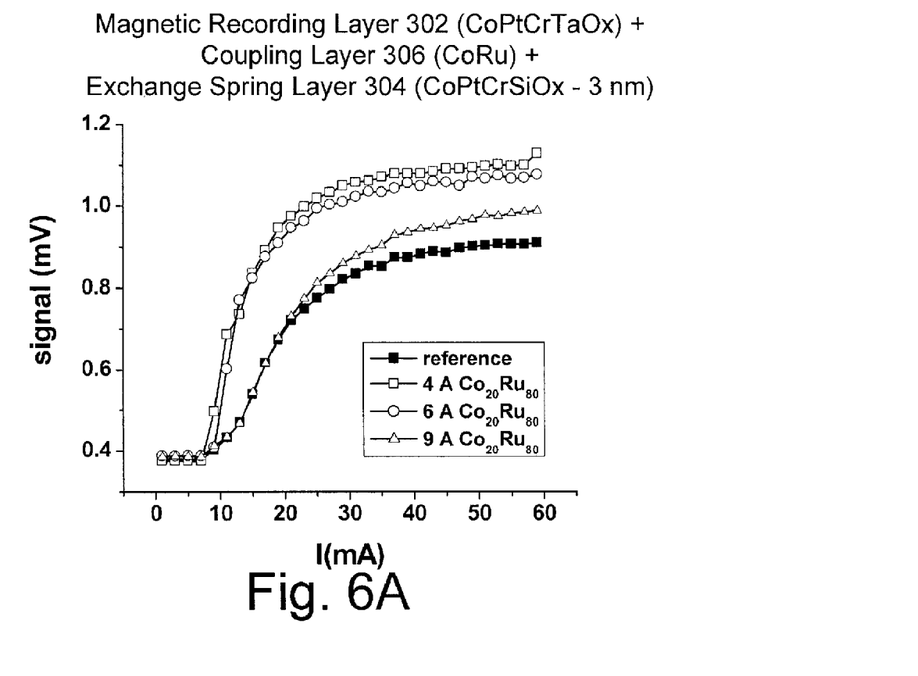
FIG. 6A is a graph illustrating the low frequency signal amplitude versus the write current for an exchange-spring structure having an exchange-spring layer thickness of three nanometers and various coupling layer thicknesses, the graph compares exchange-spring structures to a reference media without an exchange spring structure.
Figure 6B:
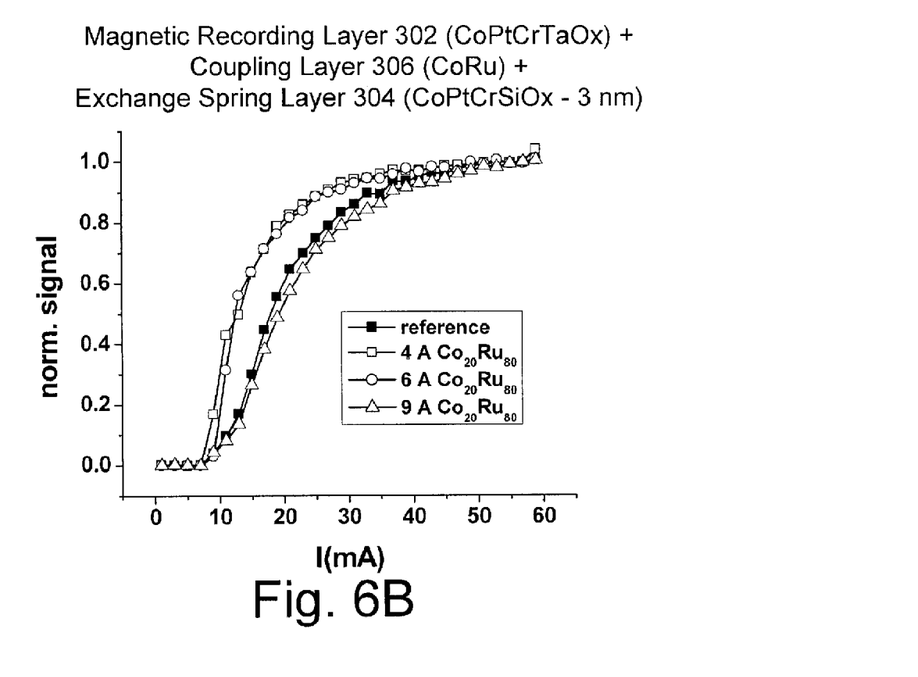
FIG. 6B is a graph illustrating the normalized low frequency signal amplitude versus the write current for an exchange-spring structure having an exchange-spring layer thickness of three nanometers and various coupling layer thicknesses, the graph compares exchange-spring structures to a reference media without an exchange spring structure.

Referring to FIGS. 6A and 6B, the low-frequency signal amplitude (LFTAA) versus the write current (I(mA)) is illustrated for a thickness of 3 nm for the exchange-spring layer 304 and various thicknesses of the coupling layer 306. In this example, the exchange-spring layer 304 is CoPtCrSiOx and the coupling layer 306 is CoRu. The reference layer is CoPtCrTaOx magnetic recording media without the exchange-spring layer 304 or the coupling layer 306.

As illustrated in FIG. 6A, for an exchange-spring structure 301 with an exchange-spring layer 304 having a thickness of three nanometers and a coupling layer 306 having a thickness of four or six angstroms, the signal amplitude saturates at lower write currents compared to the reference layer demonstrating that these structures are easier to write. These exchange-spring structures 301 also have higher signal amplitudes than the reference layer indicating that these structures add to the signal. If the CoRu layer thickness is increased to nine angstroms, however, the inter-layer exchange coupling between the exchange-spring layer 304 and the magnetic recording layer 302 is reduced and the writing improvements substantially disappear. FIG. 6A also illustrates that the signal amplitude and saturation for a nine angstrom coupling layer 306 either tracks, or is only marginally higher than the reference layer. In FIG. 6B, which shows the normalized signal of the data shown in FIG. 6A, the pure writability improvement becomes more evident because the writability improvement has been separated from the simultaneously occurring signal increase as the coupling layer 306 thickness is reduced.

Figure 7A:
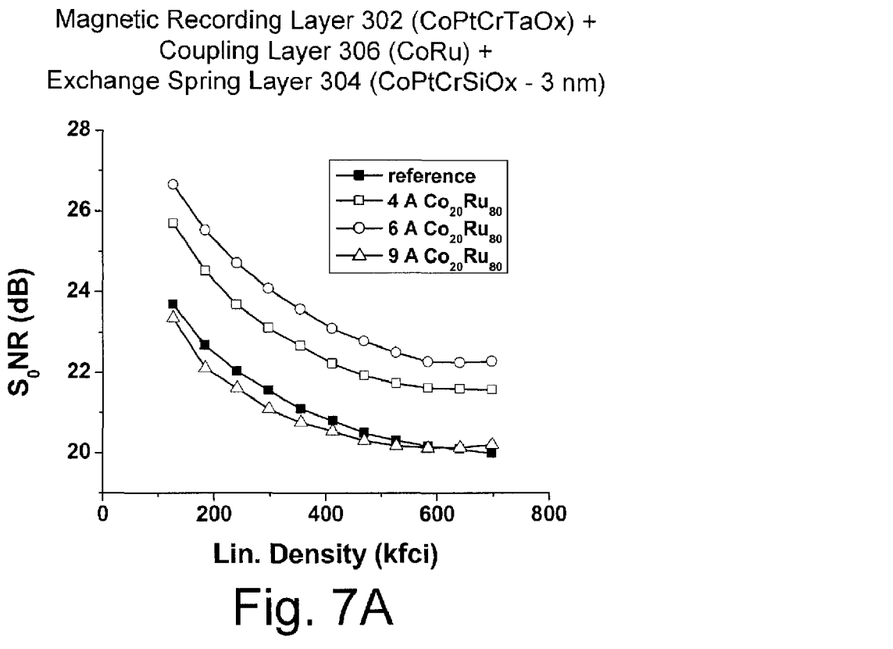
FIG. 7A is a graph illustrating the signal-to-noise ratio versus the recording density for an exchange-spring structure having an exchange-spring layer thickness of three nanometers and various coupling layer thicknesses, the graph compares exchange-spring structures to a reference media without an exchange spring structure.
Figure 7B:
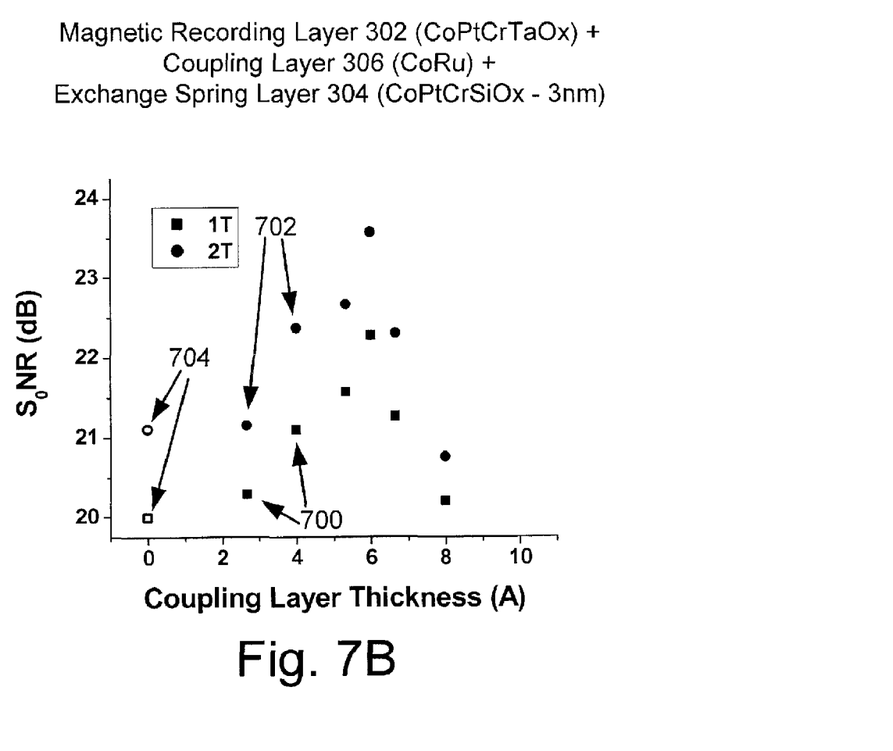
FIG. 7B is a graph illustrating the signal-to-noise ratio versus the coupling layer thickness for an exchange-spring structure having an exchange-spring layer thickness of three nanometers and for a target bit length (1T) and twice the target bit length (2T), the graph compares exchange-spring structures to a reference media without an exchange spring structure.

Referring to FIGS. 7A and 7B, the signal-to-noise ratio (SNR) is illustrated versus the recording density (FIG. 7A) and the coupling layer thickness (FIG. 7B). As illustrated by FIG. 7A, an exchange-spring structure 301 having a CoPtCrSiOx exchange-spring layer 304 that is three nanometers thick and a CoRu coupling layer 306 that is three or six angstroms thick has a better or higher signal-to-noise ratio than the CoPtCrTaOx recording media reference layer alone. An exchange-spring structure 301 having a CoPtCrSiOx exchange-spring layer 304 that is three nanometers thick and a CoRu coupling layer 306 that is nine angstroms thick, on the other hand, has a worse signal-to-noise ratio than the reference layer. Of course those of skill in the art will recognize that the specific thickness of the CoRu coupling layer 306 that provides satisfactory signal-to-noise ratios may be different when the coupling layer 306 comprises different materials or compositions along with, or in place of, Co and Ru.

FIG. 7B illustrates the signal-to-noise ratio for an exchange spring structure 301 having different thicknesses for the coupling layer 306. The signal-to-noise ratio is illustrated for both a target bit length (1T) and double the target bit length (2T). As can be seen from FIG. 7B, the signal-to-noise ratio for 1T data has a lower signal-to-noise ratio than the 2T data since the density is doubled. As further illustrated by FIG. 7B, the signal-to-noise ratio improves for an exchange-spring structure 301 with a three nanometer CoPtCrSiOx exchange-spring layer 304 in an intermediate thickness range of the coupling layer 306 for both a 1T (corresponding to a target bit length indicated by the solid square shapes 700) and a 2T (corresponding to twice the target bit length indicated by the solid circle shapes 702) measurement, compared to a CoPtCrTaOx reference layer by itself (indicated by the open shapes 704). As is also illustrated by FIG. 7B, once the coupling layer 306 reaches approximately eight angstroms, the signal-to-noise ratio falls below the signal-to-noise ratio of the reference layer. Thus, FIGS. 7A and 7B indicate that a coupling layer 306 in the range of four to seven angstrom provides a better signal-to-noise ratio than the reference layer alone, at least for a $Co_{20}Ru_{80}$ coupling layer 306. For coupling layers 306 comprising other materials or compositions, the optimal thickness may change.

Figure 8:
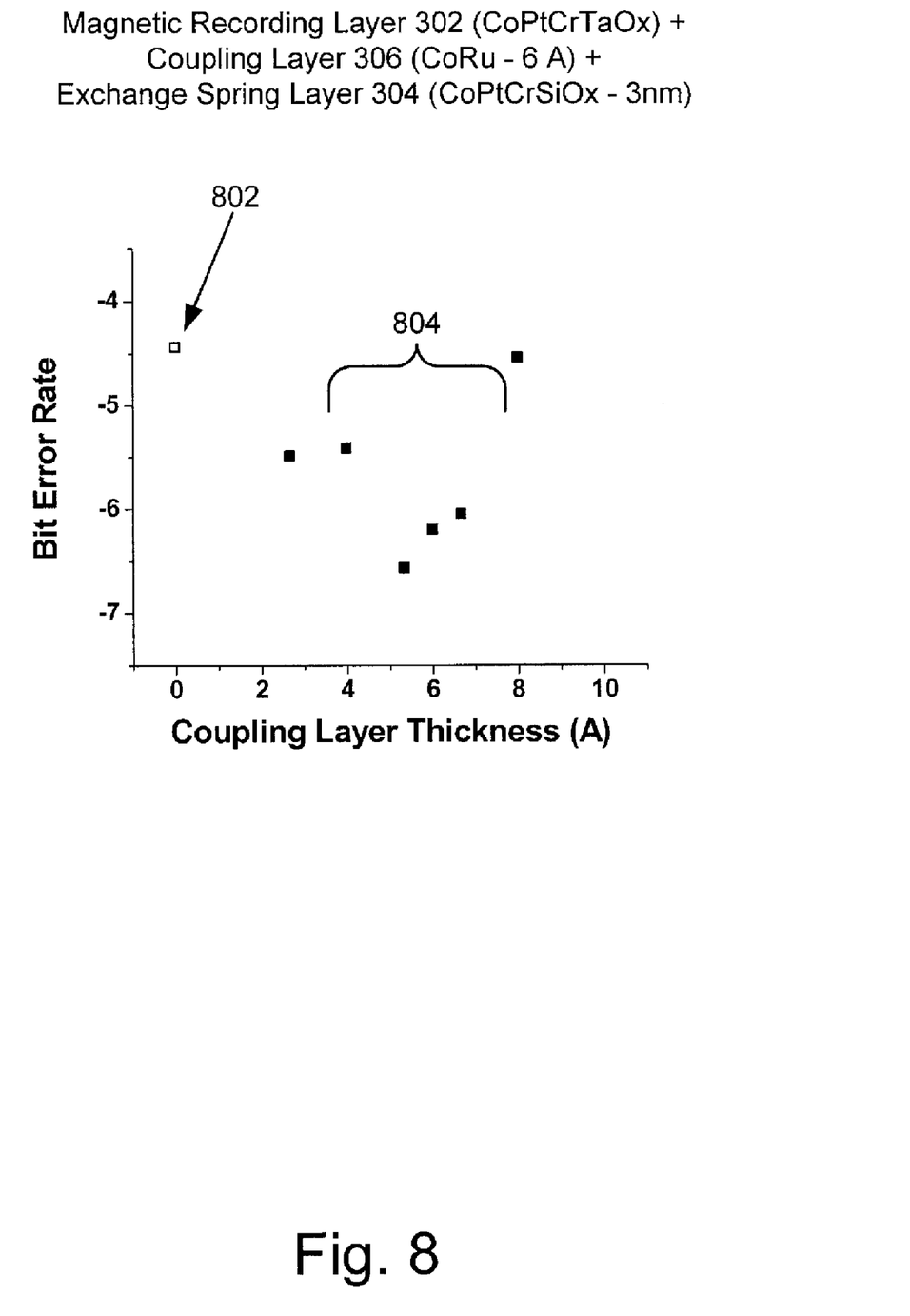
FIG. 8 is a graph illustrating the bit error rate versus the coupling layer thickness for an exchange-spring structure having an exchange-spring layer thickness of three nanometers, the graph compares exchange-spring structures to a reference media without an exchange spring structure.

Referring to FIG. 8, the bit error rate versus the CoRu coupling layer 306 is illustrated for an exchange-spring structure 301 having a CoPtCrSiOx exchange-spring layer 304 that is three nanometers thick. As illustrated, the improved signal-to-noise ratio shown in FIGS. 7A and 7B is reflected by an improved error rate, where the error rate of the exchange-spring structure is improved significantly with respect to a CoPtCrTaOx reference layer (indicated by empty square shape 802) in the CoRu coupling layer 306 thickness range of four to seven angstrom.

The higher signal-to-noise ratios and bit error rates for the exchange spring structure 301 as illustrated by FIGS. 7A, 7B, and 8 illustrate that the unique materials and thicknesses used for the exchange spring layer 304 and the coupling layer 306, as recited in the claims, do improve the signal-to-noise ratio and bit error rate of the reference layer, or the magnetic recording layer 302, by itself. This is advantageous in comparison to conventional exchange spring structures, where the magnetically softer exchange spring layer often worsens the signal-to-noise ratio and bit error rate of the underlying magnetic recording layer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A recording medium providing improved writeability in perpendicular recording applications, the recording medium comprising:
    a magnetic recording layer having a first coercivity and an axis of magnetic anisotropy substantially perpendicular to the surface thereof; and
    an exchange-spring layer having a second coercivity less than the first coercivity, the exchange-spring layer ferromagnetically exchange coupled to the magnetic recording layer, wherein a magnetization of the recording layer begins to reverse before a magnetization of the exchange-spring layer completely reverses such that the magnetization of the exchange-spring layer exerts a torque on the magnetic recording layer.

2. The recording medium of claim 1, wherein the magnetic recording layer and the exchange-spring layer comprise a granular cobalt alloy and wherein either granular cobalt alloy comprises an alloy selected from the group consisting of CoPt and CoPtCr.

3. The recording medium of claim 2, wherein either granular cobalt alloy further comprises an oxide selected from the group consisting of an Si, Ti, and Ta oxide.

4. The recording medium of 2, wherein the magnetic recording layer comprises a higher concentration of platinum than the exchange-spring layer such that the first coercivity is greater than the second coercivity.

5. The recording medium of claim 1, further comprising a coupling layer between the magnetic recording layer and the exchange-spring layer, the coupling layer comprising a material selected from the group consisting of CoRu, CoCr, CoRuCr, and alloys thereof.

6. The recording medium of claim 5, wherein the coupling layer further comprises an oxide selected from the group consisting of an Si, Ti, and Ta oxide.

7. The recording medium of claim 1, further comprising a coupling layer between the magnetic recording layer and the exchange-spring layer, wherein the coupling layer has a thickness of less than about two nanometers.

8. The recording medium of claim 7, wherein the coupling layer has a thickness of between about 0.2 nanometers and about 1 nanometer.

9. The recording medium of claim 1, wherein the exchange-spring layer has a thickness of less than about ten nanometers.

10. The recording media of claim 9, wherein the exchange-spring layer has a thickness of between about two nanometers and about six nanometers.

11. The recording medium of claim 1, wherein the magnetic recording layer and the exchange-spring layer are characterized by an inter-granular exchange coupling, the inter-granular exchange coupling of the exchange-spring layer being greater than the inter-granular exchange coupling of the magnetic recording layer.

12. The recording medium of claim 1, further comprising a soft underlayer physically coupled to the magnetic recording layer by way of an exchange break layer, the exchange break layer magnetically decoupling the soft underlayer from the magnetic recording layer.

13. A recording device providing improved writeability in perpendicular recording applications, the recording device comprising:
    a recording head for reading magnetic signals from, and writing magnetic signals to, a recording medium; and
    a recording medium configured for perpendicular recording, the recording medium comprising:
        a magnetic recording layer having a first coercivity and an axis of magnetic anisotropy substantially perpendicular to the surface thereof;
        an exchange-spring layer interposed between the magnetic recording layer and the recording head, the exchange-spring layer having a second coercivity less than the first coercivity, wherein a magnetization of the recording layer begins to reverse before a magnetization of the exchange-spring layer completely reverses such that the magnetization of the exchange-spring layer exerts a torque on the magnetic recording layer.

14. The recording device of claim 13, wherein the magnetic recording layer and the exchange-spring layer comprising a granular cobalt alloy and wherein either granular cobalt alloy comprises an alloy selected from the group consisting of CoPt and CoPtCr.

15. The recording device of claim 14, wherein either granular cobalt alloy further comprises an oxide selected from the group consisting of an Si, Ti, and Ta oxide.

16. The recording device of 14, wherein the magnetic recording layer comprises a higher concentration of platinum than the exchange-spring layer such that the first coercivity is greater than the second coercivity.

17. The recording device of claim 13, further comprising a coupling layer between the magnetic recording layer and the exchange-spring layer, the coupling layer regulating the ferromagnetic exchange coupling between the magnetic recording layer and the exchange-spring layer, wherein the coupling layer comprises a material selected from the group consisting of CoRu, CoCr, CoRuCr, and alloys thereof.

18. The recording device of claim 17, wherein the coupling layer further comprises an oxide selected from the group consisting of an Si, Ti, and Ta oxide.

19. The recording device of claim 13, further comprising a coupling layer between the magnetic recording layer and the exchange-spring layer, wherein the coupling layer has a thickness less than the exchange-spring layer.

20. The recording device of claim 19, wherein the coupling layer has a thickness of between about 0.2 nanometers and about 1 nanometer.

21. The recording device of claim 13, wherein the exchange-spring layer has a thickness of less than about ten nanometers.

22. The recording device of claim 21, wherein the exchange-spring layer has a thickness of between about two nanometers and about six nanometers.

23. The recording device of claim 22, wherein the magnetic recording layer and the exchange-spring layer are characterized by an inter-granular exchange coupling, the inter-granular exchange coupling of the exchange-spring layer being greater than the inter-granular exchange coupling of the magnetic recording layer.

24. A method for improving the writeability of magnetic perpendicular recording media, the method comprising:
    forming a magnetic recording layer having a first coercivity and an axis of magnetic anisotropy substantially perpendicular to the surface thereof; and
    forming an exchange-spring layer having a second coercivity less than the first coercivity, the exchange-spring layer ferromagnetically exchange coupled to the magnetic recording layer, wherein a magnetization of the recording layer begins to reverse before a magnetization of the exchange-spring layer completely reverses such that the magnetization of the exchange-spring layer exerts a torque on the magnetic recording layer.

25. The method of claim 24, further comprising disposing a coupling layer between the magnetic recording layer and the exchange-spring layer, the coupling layer regulating the ferromagnetic exchange coupling between the magnetic recording layer and the exchange-spring layer, wherein the coupling layer comprises a material selected from the group consisting of CoRu, CoCr, and CoRuCr.

26. The method of claim 24, wherein the coupling layer has a thickness of less than about two nanometers.

27. The method of claim 24, wherein the exchange-spring layer has a thickness of less than about ten nanometers.

28. The method of claim 24, wherein the magnetic recording layer and the exchange-spring layer are characterized by an inter-granular exchange coupling, the inter-granular exchange coupling of the exchange-spring layer being greater than the inter-granular exchange coupling of the magnetic recording layer.

* * * * *